United States Patent
Wang et al.

(10) Patent No.: US 9,866,705 B2
(45) Date of Patent: Jan. 9, 2018

(54) METHOD AND APPARATUS FOR RELOADING A MOBILE NUMBER

(71) Applicant: Xiaomi Inc., Beijing (CN)

(72) Inventors: Bin Wang, Beijing (CN); Guangjian Wang, Beijing (CN); Shuo Wang, Beijing (CN)

(73) Assignee: Xiaomi Inc., Bejing (CN)

( * ) Notice: Subject to any disclaimer, the term of this patent is extended or adjusted under 35 U.S.C. 154(b) by 9 days.

(21) Appl. No.: 15/138,300

(22) Filed: Apr. 26, 2016

(65) Prior Publication Data

US 2017/0006167 A1    Jan. 5, 2017

(30) Foreign Application Priority Data

Jun. 30, 2015   (CN) .......................... 2015 1 0386177

(51) Int. Cl.
*H04M 15/00*    (2006.01)
*H04M 15/06*    (2006.01)
*H04M 17/00*    (2006.01)

(52) U.S. Cl.
CPC ........... *H04M 15/47* (2013.01); *H04M 15/06* (2013.01); *H04M 15/09* (2013.01); *H04M 15/48* (2013.01); *H04M 15/58* (2013.01); *H04M 15/83* (2013.01); *H04M 15/856* (2013.01); *H04M 15/858* (2013.01); *H04M 17/20* (2013.01); *H04M 17/204* (2013.01)

(58) Field of Classification Search
None
See application file for complete search history.

(56) References Cited

U.S. PATENT DOCUMENTS

| 2004/0230527 A1 | 11/2004 | Hansen et al. |
| 2008/0130849 A1 | 6/2008 | Mock et al. |
| 2011/0002453 A1 | 1/2011 | Finkle |

(Continued)

FOREIGN PATENT DOCUMENTS

| CN | 102509223 A | 6/2012 |
| CN | 103096269 A | 5/2013 |

(Continued)

OTHER PUBLICATIONS

Extended European Search Report for European Application No. 16164377.0 from the European Patent Office, dated Nov. 24, 2016.

(Continued)

*Primary Examiner* — Diane Mizrahi
(74) *Attorney, Agent, or Firm* — Finnegan, Henderson, Farabow, Garrett & Dunner LLP (57) ABSTRACT

A method, an apparatus, and a non-transitory computer-readable storage medium used in reloading a mobile number are disclosed. According to some embodiments, in performing the method, the apparatus receives a request of reloading the mobile number. The request is sent by a terminal, but the mobile number does not correspond to the terminal. The apparatus then obtains information on the mobile number, and determines whether the mobile number is a trusted number based on the obtained information. When the mobile number is a trusted number, the apparatus reloads the mobile number. When the mobile number is not a trusted number, the apparatus alerts the terminal that the mobile number is not a trusted number.

7 Claims, 6 Drawing Sheets

(56) References Cited

U.S. PATENT DOCUMENTS

| | | | |
|---|---|---|---|
| 2011/0137789 A1 | 6/2011 | Kortina et al. | |
| 2013/0132854 A1* | 5/2013 | Raleigh | G06F 3/0482 715/738 |
| 2014/0066015 A1* | 3/2014 | Aissi | H04W 12/06 455/411 |
| 2014/0372319 A1 | 12/2014 | Wolovitz | |
| 2014/0373139 A1 | 12/2014 | Fu et al. | |
| 2015/0044990 A1 | 2/2015 | Lu | |
| 2015/0088754 A1* | 3/2015 | Kirsch | G06Q 20/0855 705/71 |

FOREIGN PATENT DOCUMENTS

| | | |
|---|---|---|
| CN | 103812986 A | 5/2014 |
| CN | 204347983 U | 5/2015 |
| JP | 2007-179454 A | 7/2007 |
| JP | 2007-272410 A | 10/2007 |
| JP | 2008-234300 A | 10/2008 |
| KR | 20060114521 A | 11/2006 |
| RU | 2479934 C1 | 4/2013 |

OTHER PUBLICATIONS

Office Action for Korean Application No. 10-2016-7001557, from the Korean Patent Office, dated Oct. 7, 2016.
Office Action for Russian Application No. 2016111182/08 (017656), mailed from the Russian Federal Service for Intellectual Property dated Jun. 21, 2017.
International Search Report of PCT Application No. PCT/CN2015/095007, dated Mar. 23, 2016, issued by the State Intellectual Property Office of P.R. China as ISA (5 pages).

* cited by examiner

METHOD AND APPARATUS FOR RELOADING A MOBILE NUMBER

CROSS-REFERENCE TO RELATED APPLICATIONS

The present application is based on and claims priority to Chinese Patent Application No. 201510386177.4 filed on Jun. 30, 2015, the entire contents of which are incorporated herein by reference.

FIELD

The disclosure relates to communication and, more particularly, to a method and apparatus for reloading a mobile number.

BACKGROUND

Presently, payment methods for mobile numbers, e.g., phone numbers, are not limited to paying over the counter at a business branch of a carrier. More and more users choose to reload a mobile number by using an account to pay on a mobile terminal to avoid going to the business branch of the carrier. When paying on a mobile terminal, a user can reload his/her own mobile number as well as other mobile numbers. For example, the user can enter a reloading interface on the mobile terminal, and choose to reload his/her own phone number or select a contact number from a contact list to reload.

SUMMARY

In accordance with the present disclosure, there is provided a method for reloading a mobile number including receiving a request for reloading the mobile number sent by a terminal, obtaining information on the mobile number, and determining whether the mobile number is a trusted number based on the obtained information. The method further includes reloading the mobile number if it is determined that the mobile number is a trusted number, and alerting the terminal that the mobile number is not a trusted number if it is determined that the mobile number is not a trusted number. The mobile number does not correspond to the terminal.

Also in accordance with the present disclosure, there is provided an apparatus for reloading a mobile terminal including a processor and a memory storing instructions. The instructions, when executed by the processor, cause the processor to receive a request for reloading the mobile number sent by a terminal, obtain information on the mobile number, and determine whether the mobile number is a trusted number based on the obtained information. The instructions further cause the processor to reload the mobile number if it is determined that the mobile number is a trusted number, and alert the terminal that the mobile number is not a trusted number if it is determined that the mobile number is not a trusted number. The mobile number does not correspond to the terminal.

Also in accordance with the present disclosure, there is provided a non-transitory computer-readable storage medium storing instructions that, when executed by a processor, cause the processor to receive a request for reloading the mobile number sent by a terminal, obtain information on the mobile number, and determine whether the mobile number is a trusted number based on the obtained information. The instructions further cause the processor to reload the mobile number if it is determined that the mobile number is a trusted number, and alert the terminal that the mobile number is not a trusted number if it is determined that the mobile number is not a trusted number. The mobile number does not correspond to the terminal.

It should be understood that, the general description above and detailed description below are only exemplary and explanatory, and do not limit the present disclosure.

BRIEF DESCRIPTION OF THE DRAWINGS

The accompany drawings herein, which illustrate embodiments in compliance with the present invention, are incorporated in and constitute a part of this specification, and together with the description, serve to explain the principle of the invention.

DETAILED DESCRIPTION

Exemplary embodiments will be detailed now, examples of which are illustrated in the drawings. When the following description refers to the drawings, unless indicated otherwise, the same numeral in different figures represents the same or similar element. The implementations described in the following exemplary embodiments do not necessarily represent all implementations consistent with the present disclosure. Instead, they are merely examples of the method and apparatus in accordance with some aspects of the present invention as recited in appended claims. Methods consistent with the present disclosure can be implemented, for example, in a server. In the exemplary embodiments described below, a scenario that a terminal requests to reload a phone number not corresponding to the terminal is discussed, i.e., the terminal requests to reload a phone number other than the phone number corresponding to the terminal.

Figure 1:
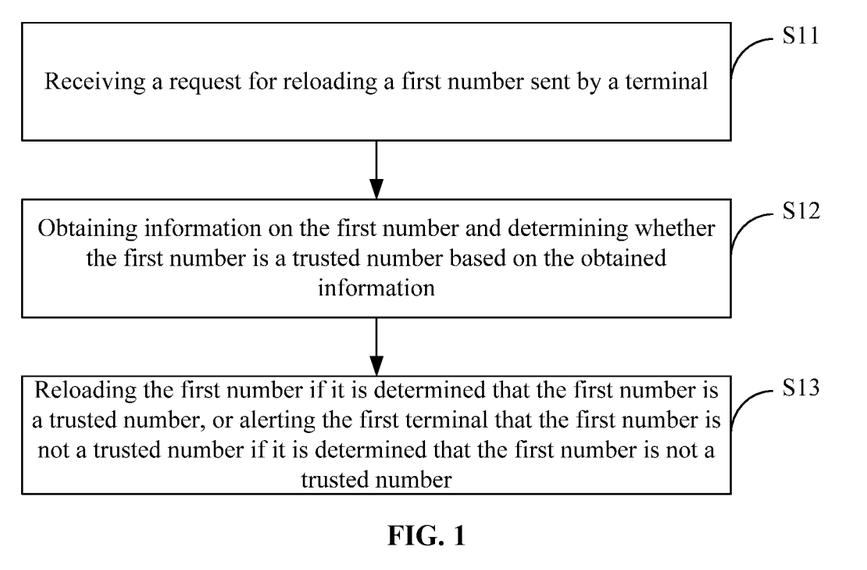
FIG. 1 is a flow chart of a method for reloading a mobile number according to an exemplary embodiment.

FIG. 1 is a flow chart of a method for reloading a mobile number according to an exemplary embodiment. As shown in FIG. 1, at S11, a request for reloading a first number sent by a terminal is received. The first number is not associated with the terminal. The terminal can be, for example, a computer, a phone, a tablet computer, or a laptop, etc.

At S12, information on the first number is obtained and whether the first number is a trusted number is determined based on the obtained information. The information on the first number can be contact information or a reloading history record, etc., which is not limited by the present embodiment.

At S13, the first number is reloaded if the first number is determined to be a trusted number, or the terminal is alerted that the first number is not a trusted number if the first number is determined to not be a trusted number.

In some embodiments, the obtained information on the first number includes the reloading history record. In such embodiments, whether the first number is a trusted number can be determined by determining whether the first number was reloaded by a plurality of different users within a specified time range and whether the number of reloading times within the specified time range exceeds a specified number of times, based on the reloading history record of the first number. If the first number was reloaded by a plurality of different users within the specified time range and the number of reloading times within the specified time range exceeds the specified number of times, the first number is determined to not be a trusted number. Otherwise, the first number is determined to be a trusted number.

In some embodiments, the obtained information on the first number includes contact information of the first number and contact information of the terminal. In such embodiments, whether the first number is a trusted number can be determined by determining whether there is an association between the first number and a second number corresponding to the terminal based on the contact information of the first number and the contact information of the terminal. If there is an association, the first number is determined to be a trusted number. If there is no association between the first number and the second number, the first number is determined to not be a trusted number.

In some embodiments, determining whether there is an association between the first number and the second number includes determining, based on the contact information of the first number and the contact information of the terminal, whether contacts of the second number include the first number or whether contacts of any contact of the second number include the first number. If the first number is in the contacts of the second number or if the first number is in the contacts of any contact of the second number, the first number is determined to be a trusted number. Otherwise, the first number is determined to not be a trusted number.

In some embodiments, after the terminal is alerted that the first number is not a trusted number, a user of the terminal is asked whether to continue reloading the first number. If confirmation from the user is received, the first number is reloaded.

Figure 2:
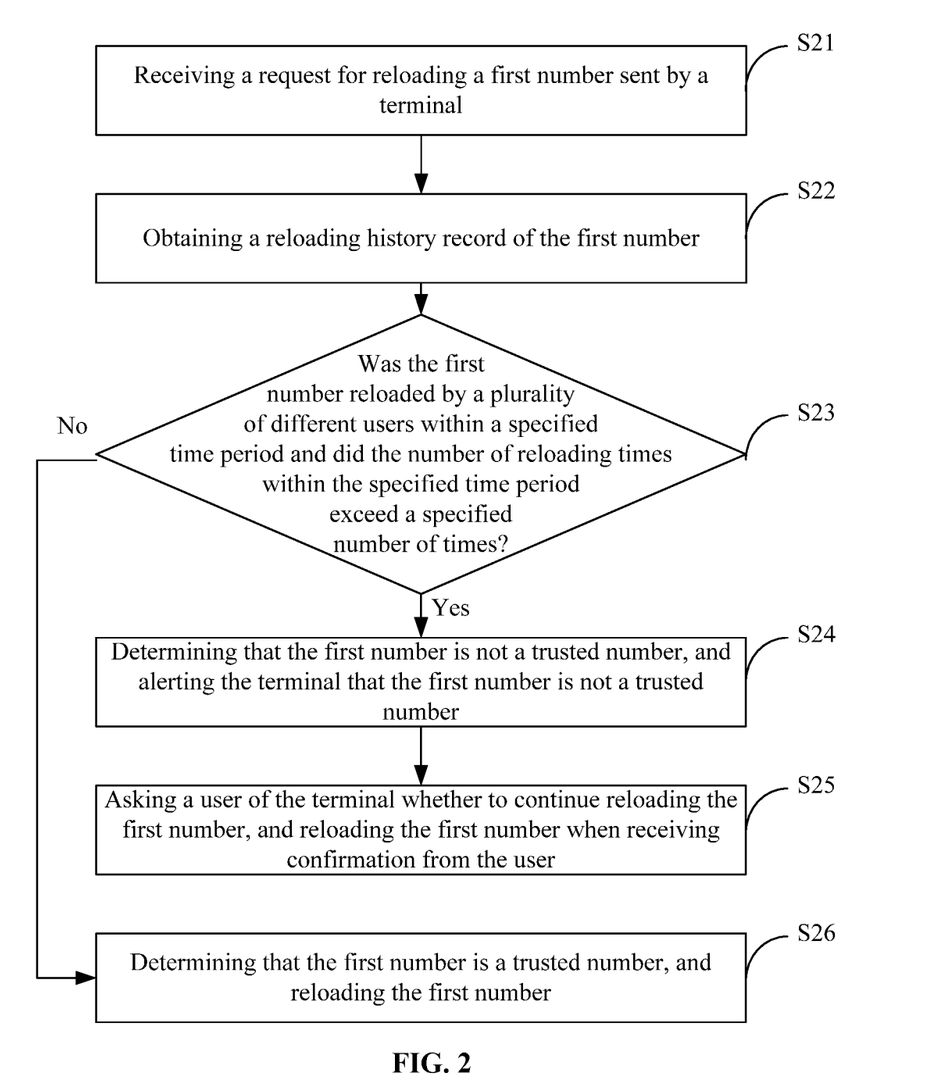
FIG. 2 is a flow chart of a method for reloading a mobile number according to another exemplary embodiment.

FIG. 2 is a flow chart of a method for reloading a mobile number according to another exemplary embodiment. As shown in FIG. 2, at S21, a request for reloading a first number sent by a terminal is received.

At S22, a reloading history record of the first number is obtained. The reloading history record is recorded and stored by the server each time the first number is reloaded so that multiple reloading records are obtained. Each reloading record can include various kinds of information, including, but not limited to: reloading time, reloading amount, payment account, etc.

At S23, whether the first number was reloaded by a plurality of different users within a specified time range and whether the number of reloading times within the specified time range exceeds a specified number of times are determined based on the reloading history record of the first number. If the first number was reloaded by a plurality of different users within the specified time range and the number of reloading times within the specified time range exceeds the specified number of times (S23: Yes), the process flow proceeds to S24. On the other hand, if the first number was not reloaded by a plurality of different users within the specified time range, or if the first number was reloaded by a plurality of different users within the specified time range but the number of reloading times does not exceed the specified number of times (S23: No), the process flow proceeds to S26. The specified time range can be set as desired, which is not limited by the present embodiment. For example, the specified time range can be set to ten hours, one day, five days, or the like. The specified number of times can also be set as desired, which is not limited by the present embodiment. For example, the specified number of times can be set to five times, ten times, twenty times, or the like.

If a plurality of different users reloaded the first number within the specified time range, it may be possible that the plurality of users are cheated by the same illegal user to reload the number of the illegal user. In such case, the first number should be confirmed as an untrusted number.

At S24, the first number is determined to not be a trusted number, and the terminal is alerted that the first number is not a trusted number. The content of the alert can be set, for example, as "the number has recently been reloaded by a plurality of persons, continue or not (beware of deception)?" etc., which is not limited by the present embodiment.

At S25, a user of the terminal is asked whether to continue reloading the first number, and the first number is reloaded if confirmation from the user is received.

At S26, the first number is determined to be a trusted number, and the first number is reloaded.

Figure 3:
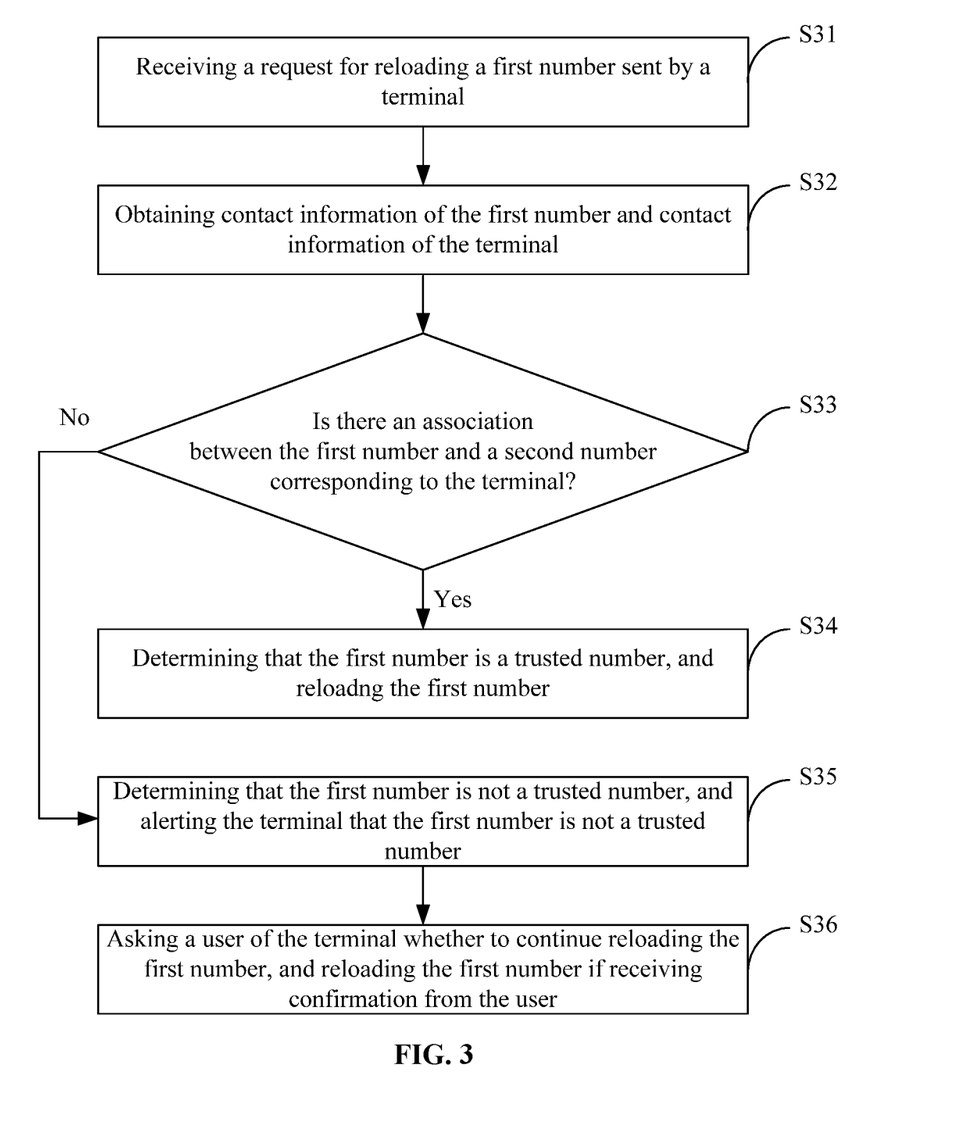
FIG. 3 is a flow chart of a method for reloading a mobile number according to another exemplary embodiment.

FIG. 3 is a flow chart of a method for reloading a mobile number according to another exemplary embodiment. As shown in FIG. 3, at S31, a request for reloading a first number sent by a terminal is received.

At S32, contact information of the first number and contact information of the terminal are obtained. In some embodiments, the server can collect and store contact information reported by a plurality of terminals in advance. A terminal can report contact information when requesting reloading. In some embodiments, the terminal can also report call records or short message records, etc., so that the server can store them to facilitate subsequent analysis and statistics.

At S33, whether there is an association between the first number and a second number corresponding to the terminal is determined based on the contact information of the first number and the contact information of the terminal. If there is an association (S33: Yes), the process flow proceeds to S34. If there is no association (S33: No), the process flow proceeds to S35. In some embodiments, determining whether there is an association between the first number and the second number includes determining whether contacts of the second number include the first number or determining whether contacts of any contact of the second number include the first number, based on the contact information of the first number and the contact information of the terminal. If the contacts of the second number include the first number, i.e., if the first number is a contact of the second number, then it can be confirmed that the first number belongs to a friend of the user of the terminal, and thus the first number is determined to be a trusted number. Alternatively, if the contacts of any contact of the second number include the first number, i.e., if the first number is a contact of a contact of the second number, then it can be confirmed that the first number belongs to a friend of a friend of the user of the terminal, and thus the first number is determined to be a trusted number. On the other hand, if the first number is neither a contact of the second number nor a contact of a contact of the second number, the first number is determined to not be a trusted number.

At S34, the first number is determined to be a trusted number, and the first number is reloaded.

At S35, the first number is determined to not be a trusted number, and the terminal is alerted that the first number is not a trusted number. The content of the alert can be set, for example, as "the number is neither a friend nor a friend of your friend, continue or not?" etc., which is not limited by the present embodiment.

At S36, the user of the terminal is asked whether to continue reloading the first number, and the first number is reloaded if confirmation from the user is received.

Figure 4:
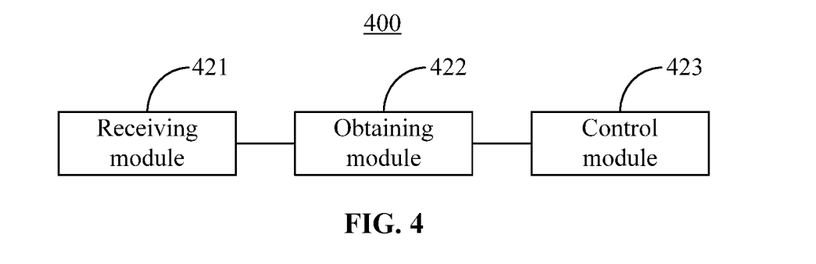
FIG. 4 is a block diagram of an apparatus for reloading a mobile number according to an exemplary embodiment.

FIG. 4 is a block diagram of an apparatus 400 for reloading a mobile number according to an exemplary embodiment. Referring to FIG. 4, the apparatus 400 includes a receiving module 421, an obtaining module 422, and a control module 423. The receiving module 421 is configured to receive a request for reloading a first number sent by a terminal. The obtaining module 422 is configured to obtain information on the first number and to determine whether the first number is a trusted number based on the obtained information. The control module 423 is configured to reload the first number if it is determined that the first number is a trusted number and to alert the terminal that the first number is not a trusted number if it is determined that the first number is not a trusted number.

Figure 5:
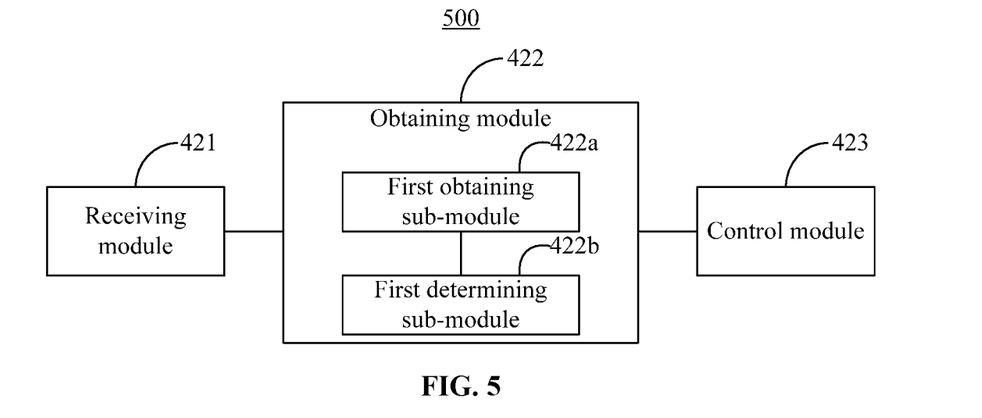
FIG. 5 is a block diagram of an apparatus for reloading a mobile number according to another exemplary embodiment.

FIG. 5 is a block diagram of an apparatus 500 for reloading a mobile number according to another exemplary embodiment. The apparatus 500 includes the receiving module 421, the obtaining module 422, and the control module 423. As shown in FIG. 5, the obtaining module 422 includes a first obtaining sub-module 422a and a first determining sub-module 422b. The first obtaining sub-module 422a is configured to obtain a reloading history record of the first number. The first determining sub-module 422b is configured to determine whether the first number was reloaded by a plurality of different users within a specified time range and whether the number of reloading times within the specified time range exceeds a specified number of times, based on the reloading history record of the first number. The first obtaining sub-module 422a determines that the first number is not a trusted number if the first number was reloaded by a plurality of different users within the specified time range and the number of reloading times within the specified time range exceeds a specified number of times, and otherwise determines that the first number is a trusted number.

Figure 6:
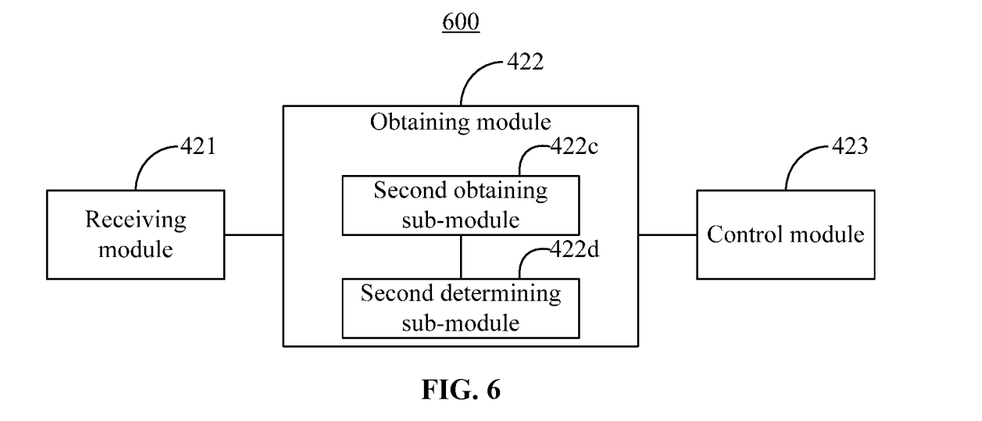
FIG. 6 is a block diagram of an apparatus for reloading a mobile number according to another exemplary embodiment.

FIG. 6 is a block diagram of an apparatus 600 for reloading a mobile number according to another exemplary embodiment. The apparatus 600 includes the receiving module 421, the obtaining module 422, and the control module 423. As shown in FIG. 6, the obtaining module 422 includes a second obtaining sub-module 422c and a second determining sub-module 422d. The second obtaining sub-module 422c is configured to obtain contact information of the first number and contact information of the terminal. The second determining sub-module 422d is configured to determine whether there is an association between the first number and a second number corresponding to the terminal, based on the contact information of the first number and the contact information of the terminal. The second determining sub-module 422d determines that the first number is a trusted number if there is an association, and determines that the first number is not a trusted number if there is no association.

In some embodiments, the second determining sub-module 422d is configured to determine whether contacts of the second number include the first number or whether contacts of any contact of the second number include the first number, based on the contact information of the first number and the contact information of the terminal. The second determining sub-module 422d determines that the first number is a trusted number if the contacts of the second number include the first number or the contacts of a contact of the second number include the first number, and determines that the first number is not a trusted number if neither the contacts of the second number include the first number nor the contacts of any contact of the second number include the first number.

In some embodiments, the control module 423 is further configured to, after alerting the terminal that the first number is not a trusted number, ask a user of the terminal whether to continue reloading the first number, and reloading the first number if receiving confirmation from the user.

Detailed operations of the above-described apparatuses are similar to the exemplary methods described above, and thus their detailed description is omitted here.

Figure 7:
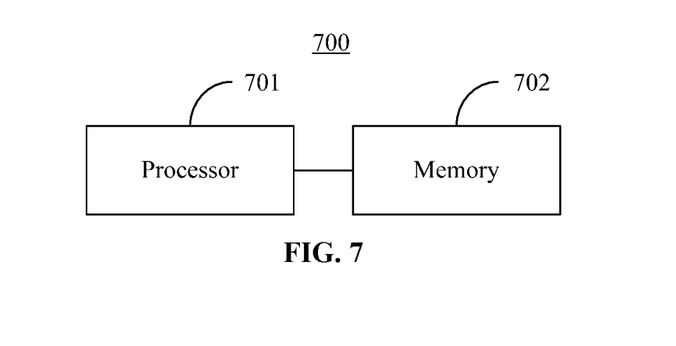
FIG. 7 is a block diagram of an apparatus for reloading a mobile number according to another exemplary embodiment.

FIG. 7 is a block diagram of an apparatus 700 for reloading a mobile number according to another exemplary embodiment. Referring to FIG. 7, the apparatus 700 includes a processor 701 and a memory 702 for storing instructions executable by the processor 701. The processor 701 is configured to perform a method consistent with the present disclosure, such as one of the above-described exemplary methods.

Figure 8:
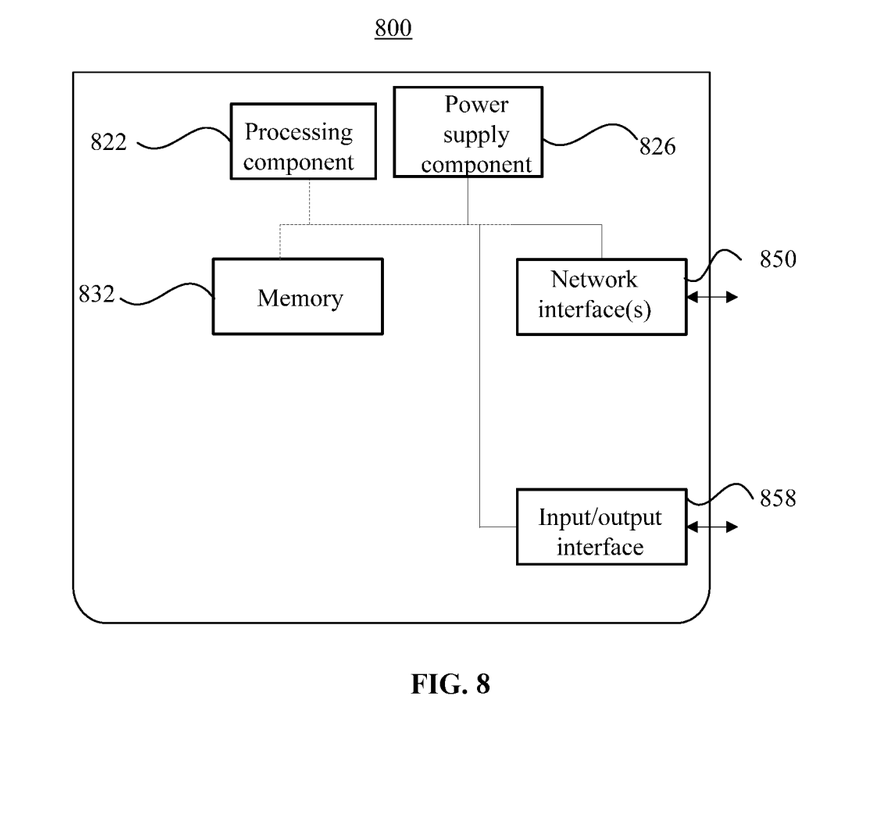
FIG. 8 is a block diagram of an apparatus for reloading a mobile number according to another exemplary embodiment.

FIG. 8 is a block diagram of an apparatus 800 for reloading a mobile terminal according to another exemplary embodiment. The apparatus 800 can be implemented, for example, as a server. Referring to FIG. 8, the apparatus 800 includes a processing component 822, which may further include one or more processors. The apparatus 800 also includes a memory resource represented by a memory 832 for storing instructions, such as application programs, which can be executed by the processing component 822. The memory 832 can include a non-transitory computer-readable storage medium. Application programs stored in the memory 832 can include one or more modules, each corresponding to a set of instructions. Additionally, the processing component 822 can be configured to execute instructions, so as to perform a method consistent with the present disclosure, such as one of the above-described exemplary methods.

The apparatus 800 further includes a power supply module 826 configured to perform power management for the apparatus 800, a wired or wireless network interface 850 configured to connect the apparatus 800 to a network, and an input/output (I/O) interface 858. The apparatus 800 can work based on an operating system stored in the memory 832, such as Windows Server™, Mac OS X™, Unix™, Linux™, FreeBSD™, or the like.

Figure 9:
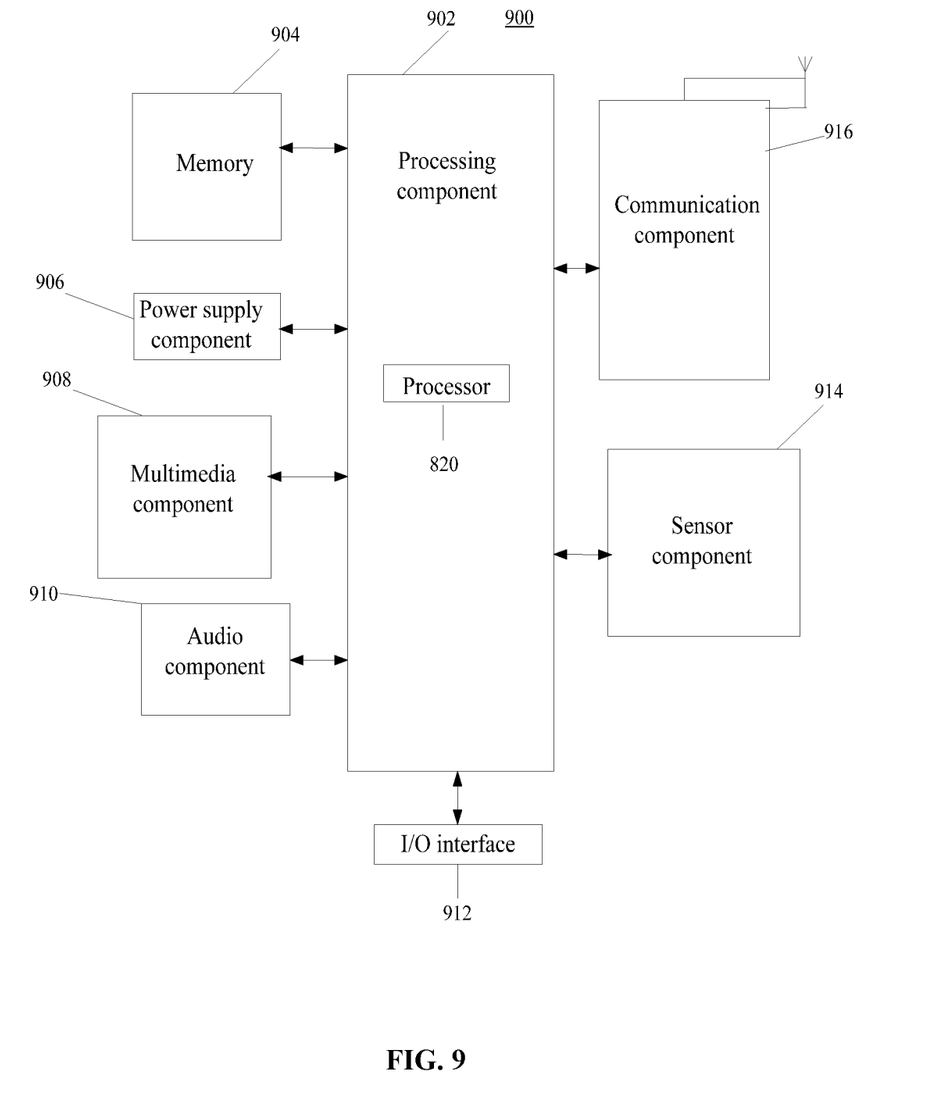
FIG. 9 is a block diagram of an apparatus for reloading a mobile number according to another exemplary embodiment.

FIG. 9 is a block diagram of an apparatus 900 for reloading a mobile number according to another exemplary embodiment. For example, the apparatus 900 can be a mobile phone, a computer, a digital broadcast terminal, a message transceiving device, a game console, a tablet device, a medical device, exercise equipment, a personal digital assistant, etc.

Referring to FIG. 9, the apparatus 900 includes one or more of the following components: a processing component 902, a memory 904, a power supply component 906, a multimedia component 908, an audio component 910, an input/output (I/O) interface 912, a sensor component 914 and a communication component 916.

The processing component 902 usually controls the overall operations of the apparatus 900, such as operations associated with display, phone call, data communication, camera operation and recording operation. The processing component 902 may include one or more processors 920 to execute instructions, so as to accomplish part or all of a method consistent with the present disclosure, such as one of the above-described exemplary methods. Additionally, the processing component 902 may include one or more modules to facilitate interaction between the processing component 902 and another component. For example, the processing component 902 may include a multimedia module to facilitate interaction between the multimedia component 908 and the processing component 902.

The memory 904 may be configured to store various types of data to support operations on the apparatus 900. Examples of these data may include instructions of any application program or method operated on the apparatus 900, contact data, phone book data, message, picture, video, etc. The memory 904 may be implemented by any type of volatile or non-volatile storage device or the combination thereof, such as static random access memory (SRAM), electrically erasable programmable read only memory (EEPROM), erasable programmable read-only memory (EPROM), programmable read-only memory (PROM), read-only memory (ROM), magnetic memory, flash memory, magnetic disk or optical disk.

The power supply component 906 may supply power for various components of the apparatus 900. The power supply component 906 may include a power supply management system, one or more power supplies and other components associated with power generation, management and distribution for the apparatus 900.

The multimedia component 908 may include a screen that provides an output interface between the apparatus 900 and a user. In some embodiments, the screen may include a liquid crystal display (LCD) and a touch panel. If the screen includes a touch panel, the screen may be implemented as a touch screen so as to receive an input signal from the user. A touch panel may include one or more touch sensors to sense a touch, a slide and a gesture on the touch panel. The touch sensor can not only sense the boundary of a touch or slide operation, but also detect the pressure and duration related to the touch or slide operation. In some embodiments, the multimedia component 908 may include a front-facing camera and/or rear-facing camera. When the apparatus 900 is in operation mode, such as shooting mode or video mode, the front-facing camera and/or rear-facing camera may receive external multimedia data. Each of the front-facing camera and rear-facing camera may be a fixed optical lens system or have the capability of focus and optical zoom.

The audio component 910 may be configured to output and/or input an audio signal. For example, the audio component 910 may include a microphone, which may be configured to receive an external audio signal when the apparatus 900 is in operation mode, such as a call mode, a record mode and a voice recognition mode. The received audio signal may further be stored in the memory 904 or transmitted via the communication component 916. In some embodiments, the audio component 910 may further include a speaker for outputting an audio signal.

The I/O interface 912 provides an interface between the processing component 902 and a peripheral interface module, wherein the peripheral interface module may be a keyboard, a click wheel, a button, etc. The button may include but is not limited to: a homepage button, a volume button, a start button and a lock button.

The sensor component 914 may include one or more sensors for providing state assessment for various aspects of the apparatus 900. For example, the sensor component 914 may detect an open/close state of the apparatus 900, relative positioning of components, such as a display and a keypad of the apparatus 900. The sensor component 914 may further detect a position change of the apparatus 900 or a component thereof, existence or absence of a user's contact with the apparatus 900, orientation or acceleration/deceleration of the apparatus 900, and a temperature change of the apparatus 900. The sensor component 914 may include a proximity sensor configured to detect existence of a nearby object without any physical contact. The sensor component 914 may further include an optical sensor, such as a CMOS or CCD image sensor, for use in an imaging application. In some embodiments, the sensor component 914 may further include an acceleration sensor, a gyroscope sensor, a magnetic sensor, a pressure sensor or a temperature sensor.

The communication component 916 may be configured to facilitate wired or wireless communication between the apparatus 900 and another device. The apparatus 900 may access a wireless network based on a communication standard, such as WiFi, 2G, 3G, or 4G, or a combination thereof. In one exemplary embodiment, the communication component 916 may receive a broadcast signal or broadcast related information from an external broadcast management system via a broadcast channel. In one exemplary embodiment, the communication component 916 may further include a near field communication (NFC) module to facilitate short range communication. For example, the NFC module may be implemented based on radio frequency identification (RFID) technology, infrared data association (IrDA) technology, ultra wideband (UWB) technology, Bluetooth technology and other technology.

In an exemplary embodiment, the apparatus 900 may be implemented by one or more of an application specific integrated circuit (ASIC), a digital signal processor (DSP), a digital signal processing device (DSPD), a programmable logical device (PLD), a field programmable gate array (FPGA), a controller, a microcontroller, a microprocessor or other electronic element, so as to perform steps such as reporting contact information to a server, receiving a recharge alert or confirmation returned by the server when recharging, etc.

In an exemplary embodiment, a non-transitory computer-readable storage medium including instructions, such as a memory 904 including instructions, is further provided. The above instructions can be executed by the processor 920 of the apparatus 900 to, for example, report contact information to a server, receive a reloading alert or confirmation returned by the server when reloading, etc. For example, the non-transitory computer-readable storage medium can be a ROM, a random access memory (RAM), a CD-ROM, a tape, a floppy disk, or an optical data storage device, etc.

The above non-transitory computer readable storage medium can provide data for a server to conduct analysis and statistics, and facilitate the server's analysis of the reloaded number to determine whether the number is a trusted number. As such, a reloading behavior can be controlled, security in reloading a mobile number can be increased, mistaken reloading can be avoided, and damage to a user's property can be prevented.

According to the present disclosure, before a number is reloaded, it is determined whether the number is a trusted number and reloading is conducted based on the results of the determination. As a result, the security in reloading is increased, mistaken reloading is avoided, and damage to a user's property is prevented.

Those skilled in the art, after contemplating the specification and practicing the invention disclosed herein, will conceive of other implementations of the invention. The present disclosure is intended to encompass any variation, usage, or adaptation that complies with the general principle of the present invention and includes common sense or customary technical means in the present technical field not described above. The specification and embodiments are merely exemplary, and the true spirit and scope of the invention are set forth in appended claims.

As will be appreciated, the present invention is not limited to the precise structure described above and shown in the figures, and various modifications and changes may be made thereto without departing from the scope of the invention, which is defined by appended claims.

What is claimed is:

1. A method of reloading a mobile number, comprising:
   receiving, from a terminal, a request of reloading the mobile number;
   obtaining information on the mobile number;
   determining, based on the obtained information, whether the mobile number is a trusted number;
   reloading the mobile number when the mobile number is determined to be a trusted number; and
   alerting the terminal that the mobile number is not a trusted number when the mobile number is determined to not be a trusted number,
   wherein the mobile number does not correspond to the terminal;
   wherein:
      obtaining the information on the mobile number includes obtaining a reloading history record of the mobile number, and
      determining whether the mobile number is a trusted number includes:
         determining, based on the reloading history record, whether the mobile number was reloaded by a plurality of different users within a specified time range and whether a number of reloading times within the specified time range exceeds a specified number of times;
         determining that the mobile number is not a trusted number when the mobile number was reloaded by a plurality of different users within the specified time range and the number of reloading times within the specified time range exceeds the specified number of times; and
         determining that the mobile number is a trusted number when the mobile number was not reloaded by a plurality of different users within the specified time range or the number of reloading times within the specified time range does not exceed the specified number of times; or
   wherein:
      obtaining the information on the mobile number includes obtaining contact information of the mobile number and contact information of the terminal, and
      determining whether the mobile number is a trusted number includes:
         determining, based on the contact information of the mobile number and the contact information of the terminal, whether there is an association between the mobile number and a number corresponding to the terminal;
         determining that the mobile number is a trusted number when there is an association; and
         determining that the mobile number is not a trusted number when there is no association.

2. The method according to claim 1, wherein:
   determining whether there is an association between the mobile number and the number corresponding to the terminal includes determining whether contacts of the number corresponding to the terminal include the mobile number or whether contacts of any contact of the number corresponding to the terminal include the mobile number,
   determining that the mobile number is a trusted number when there is an association includes determining that the mobile number is a trusted number when the contacts of the number corresponding to the terminal include the mobile number or the contacts of a contact of the number corresponding to the terminal include the mobile terminal, and
   determining that the mobile number is not a trusted number when there is no association includes determining that the mobile number is not a trusted number when the contacts of the number corresponding to the terminal do not include the mobile number and the contacts of any contact of the number corresponding to the terminal do not include the mobile number.

3. The method according to claim 1, further comprising, after alerting the terminal:
   asking a user of the terminal whether to continue reloading the mobile number;
   receiving a confirmation from the user; and
   in response to receiving the confirmation, reloading the mobile number.

4. An apparatus configured to reload a mobile terminal, the apparatus comprising:
   a processor; and
   a memory storing instructions that, when executed by the processor, cause the processor to:
      receive, from a terminal, a request of reloading the mobile number;
      obtain information on the mobile number;
      determine, based on the obtained information, whether the mobile number is a trusted number;
      reload the mobile number when the mobile number is determined to be a trusted number; and
      alert the terminal that the mobile number is not a trusted number when the mobile number is determined to not be a trusted number,
      wherein the mobile number does not correspond to the terminal,
   wherein the instructions further cause the processor to:
      obtain a reloading history record of the mobile number;
      determine, based on the reloading history record, whether the mobile number was reloaded by a plurality of different users within a specified time range and whether a number of reloading times within the specified time range exceeds a specified number of times;
      determine that the mobile number is not a trusted number when the mobile number was reloaded by a plurality of different users within the specified time range and the number of reloading times within the specified time range exceeds the specified number of times; and
      determine that the mobile number is a trusted number when the mobile number was not reloaded by a plurality of different users within the specified time range or the number of reloading times within the specified time range does not exceed the specified number of times; or wherein the instructions further cause the processor to:
obtain contact information of the mobile number and contact information of the terminal;
determine, based on the contact information of the mobile number and the contact information of the terminal, whether there is an association between the mobile number and a number corresponding to the terminal;
determine that the mobile number is a trusted number when there is an association; and
determine that the mobile number is not a trusted number when there is no association.

5. The apparatus according to claim 4, wherein the instructions further cause the processor to:
determine whether contacts of the number corresponding to the terminal include the mobile number or whether contacts of any contact of the number corresponding to the terminal include the mobile number;
determine that the mobile number is a trusted number when the contacts of the number corresponding to the terminal include the mobile number or the contacts of a contact of the number corresponding to the terminal include the mobile terminal; and
determine that the mobile number is not a trusted number when the contacts of the number corresponding to the terminal do not include the mobile number and the contacts of any contact of the number corresponding to the terminal do not include the mobile number.

6. The apparatus according to claim 4, wherein the instructions further cause the processor to, after alerting the terminal:
ask a user of the terminal whether to continue reloading the mobile number;
receive a confirmation from the user; and
in response to receiving the confirmation, reload the mobile number.

7. A non-transitory computer-readable storage medium storing instructions that, when executed by a processor, cause the processor to:
receive, from a terminal, a request of reloading the mobile number;
obtain information on the mobile number;
determine, based on the obtained information, whether the mobile number is a trusted number;
reload the mobile number when the mobile number is determined to be a trusted number; and
alert the terminal that the mobile number is not a trusted number when the mobile number is determined to not be a trusted number,
wherein the mobile number does not correspond to the terminal; and
wherein the instructions further cause the processor to:
obtain a reloading history record of the mobile number;
determine, based on the reloading history record, whether the mobile number was reloaded by a plurality of different users within a specified time range and whether a number of reloading times within the specified time range exceeds a specified number of times;
determine that the mobile number is not a trusted number when the mobile number was reloaded by a plurality of different users within the specified time range and the number of reloading times within the specified time range exceeds the specified number of times; and
determine that the mobile number is a trusted number when the mobile number was not reloaded by a plurality of different users within the specified time range or the number of reloading times within the specified time range does not exceed the specified number of times; or wherein the instructions further cause the processor to:
obtain contact information of the mobile number and contact information of the terminal;
determine, based on the contact information of the mobile number and the contact information of the terminal, whether there is an association between the mobile number and a number corresponding to the terminal;
determine that the mobile number is a trusted number when there is an association; and
determine that the mobile number is not a trusted number when there is no association.

* * * * *